L. L. TOWER.

ERASER-HOLDER AND PENCIL-POINT PROTECTORS.

No. 6,767. Reissued Nov. 23, 1875.

Witnesses:

Orestes Cleveland

Geo Roberts

Inventor:

Levi L. Tower by Munson & Philipp,

Attorneys.

UNITED STATES PATENT OFFICE.

LEVI L. TOWER, OF BOSTON, MASSACHUSETTS, ASSIGNOR TO ORESTES CLEVELAND, OF JERSEY CITY, NEW JERSEY.

IMPROVEMENT IN ERASER-HOLDERS AND PENCIL-POINT PROTECTORS.

Specification forming part of Letters Patent No. 155,272, dated September 22, 1874; reissue No. 6,767, dated November 23, 1875; application filed November 6, 1875.

DIVISION B.

*To all whom it may concern:*

Figure 1:
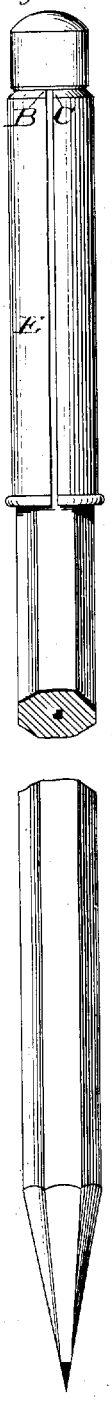
Figure 2:
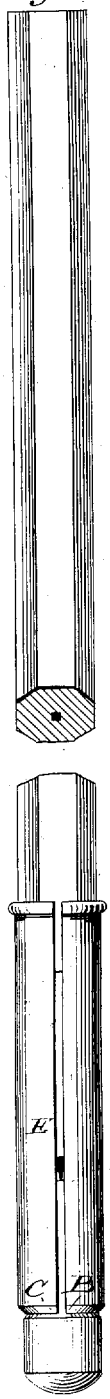
Figure 3:
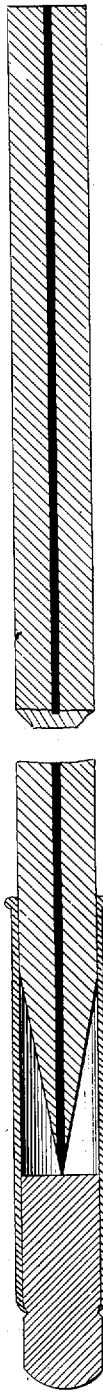
Figure 4:
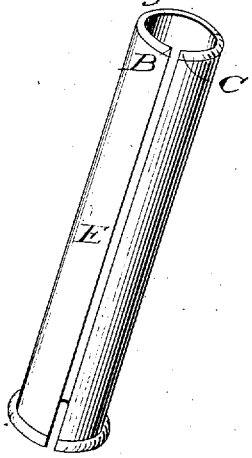
Figure 5:
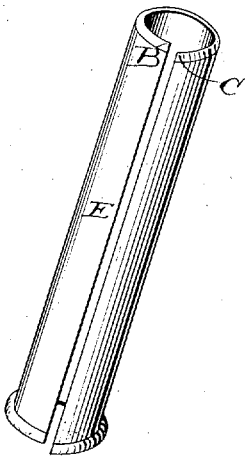

Be it known that I, LEVI L. TOWER, of Boston, in the county of Suffolk and State of Massachusetts, have invented certain new and useful Improvements in Pencil-Point Protectors and Eraser-Holders combined, of which the following is a specification:

In the drawings, where like letters indicate like parts, Figure 1 is a perspective view of a lead-pencil with the eraser-holder mounted thereon; Fig. 2, a similar view with the eraser-holder adjusted as a point-protector; Fig. 3, a longitudinal section of Fig. 2; Fig. 4, a perspective view of the eraser-holding tube with the erasive head detached therefrom; and Fig. 5, a perspective view, showing the distorted form which the holder assumes when the erasive head is being forcibly introduced therein.

The invention consists of a cylindrical metallic holder, which is split longitudinally, and provided with an inwardly-curved projecting lip or flange, which impresses or impinges against the sides of an elastic erasive head introduced therein, and thereby secures it in position for use, said holder being of a uniform diameter, whereby it is adapted to receive the end of a lead-pencil, and permit its point to bear upon and be cushioned against the inner end of the elastic erasive head.

This tubular holder is formed by any of the methods commonly employed in the production of metal tubes, and has its edge at one end bent inwardly, so as to form a curved projecting lip or flange by the well-known process of flanging the ends of metal tubes. It is preferably constructed of brass or steel, and is divided longitudinally, so as to form a cylindrical spring, which firmly clasps or clamps the pencil or erasive head when either is forced into it.

The erasive head is likewise cylindrical, but of a diameter slightly larger than the greatest interior diameter of the holder. When this erasive head is to be inserted in the holder it is pressed against the lip or flange, which partially closes one end of the holder, and the pressure exerted against the corner C will be sufficient to spring or twist the body of the holder and impart a longitudinal movement to its part E, which will, consequently, depress the said corner C slightly below the corner B, as in Fig. 5. The corner B thus left extending above the corner C exposes the end of the lip or flange, and provides a space underneath the same, which permits the erasive head to engage with said lip or flange. The flexible character of the erasive head will readily admit its entering upon the lip or flange, and as the holder, when distorted, as in Fig. 5, causes the flanged end to assume a spiral form, it follows that it will act as a screw-thread, so that when the erasive head is rotated while pressed against the end of the holder it may be readily propelled into the tubular holder. As its rotation ceases and the pressure is removed the tubular holder springs back to its normal position, as in Fig. 4, which restores the inwardly-projecting lip or flange to its former position, where it rests in or nearly in the same plane, and impresses or impinges against the sides of the erasive head, holding it firmly in place, as in Fig. 3. A reverse movement will enable the eraser to be withdrawn, as is apparent.

The erasive head may thus be adjusted within the end of the tubular holder, so as to protrude a sufficient distance for use in erasing marks, or be enveloped within said end for protection from dirt.

The tube may be forced upon either end of a pencil, as is the practice in manipulating pencil-point-protecting tubes, its longitudinal division enabling it to open or spread to embrace the pencil.

When in use as a point-protector it is forced onto the pencil until the pencil-point abuts against the inner end of the erasive head, the elastic character of which preserves the point from being broken, and the retaining lip or flange of the holder preventing the erasive head from being driven out of the tube.

Having thus described my invention, what I claim is—

1. The combination of an erasive head with a holding-tube divided lodgitudinally, and having one end provided with an inwardly-projecting flange, which may be distorted into a spiral form to propel the erasive head within said tube, substantially as shown and described.

2. The combination of an erasive head with a pencil-point protector and eraser-holder combined, consisting of a tube split to adapt it to be held upon a pencil, and provided with means, substantially as shown and described, for securing said erasive head therein, said tube being adapted to receive a pencil and cushion its point against the inner end of the erasive head.

In testimony whereof I have hereunto signed my name in the presence of two subscribing witnesses.

LEVI L. TOWER.

Witnesses:
FRED. W. GROBY,
C. E. FOLSOM.